3,277,057
HIGH MOLECULAR WEIGHT COPOLYMERS OF UNSATURATED ALDEHYDES AND UNSATURATED KETONES AND THEIR PREPARATION

Vincent A. Campanile, Moraga, and William T. Tsatsos, San Mateo, Calif., assignors to Shell Oil Company, New York, N.Y., a corporation of Delaware
No Drawing. Filed Dec. 19, 1960, Ser. No. 85,945
14 Claims. (Cl. 260—64)

This invention relates to new copolymers and their preparation. More particularly, the invention relates to new high molecular weight copolymers of unsaturated aldehydes, to their preparation and to their utilization, particularly for the treatment of paper.

Specifically, the invention provides new and particularly useful copolymers comprising the product of polymerization of a mixture of an unsaturated aldehyde, and preferably acrolein, with an ethylenically unsaturated ketone, such as methyl vinyl ketone, said copolymers preferably having an intrinsic viscosity above 0.5 dl./g. The invention further provides a new process for preparing the above-described copolymers.

As a special embodiment, the invention provides new and valuable water soluble derivatives of the above-described copolymers obtained by treating the said polymers with a water solubilizing agent, such as sulfur dioxide or sodium bisulfite. As a further special embodiment, the invention provides a method for utilizing these water soluble high molecular weight copolymers and the treatment of paper to impart unexpected high wet strengths and improved dimensional stability.

As a further embodiment, the invention provides new and useful solvent soluble derivatives of the above noted high molecular weight copolymers.

It is known that unstabilized acrolein changes spontaneously into a solid insoluble polymer known as "disacryl." This same insoluble polymer can also be obtained by heating acrolein to high temperatures in the presence of peroxides. These insoluble polymers have never acquired any technical importance chiefly because of their thermosetting nature and their low molecular weight.

It is an object of the invention to provide new polymers of unsaturated aldehydes, such as acrolein. It is a further object to provide new copolymers of unsaturated aldehydes which have very high molecular weights. It is a further object to provide new copolymers of unsaturated aldehydes which are thermoplastic and can be molded to form valuable plastic products. It is a further object to provide an efficient process for preparing high molecular weight thermoplastic polymers of acrolein. It is a further object to provide new water soluble and solvent soluble derivatives of high molecular weight aldehyde copolymers. It is a further object to provide new water insoluble high molecular weight copolymers of unsaturated aldehydes which are particularly useful and valuable in industry. It is a further object to provide new materials for treating paper. These and other objects of the invention will be apparent from the following detailed description thereof.

It has now been discovered that these and other objects may be accomplished by the new copolymers of the invention comprising the product of polymerization of an unsaturated aldehyde and preferably acrolein with an ethylenically unsaturated ketone, such as methyl vinyl ketone said copolymers preferably having an intrinsic viscosity above 0.5 dl./g. It has surprisingly been found that these particular copolymers are thermoplastic and can be easily molded to form valuable plastic products. In addition, they have surprisingly high molecular weights and the resulting products have surprisingly good strength and impact resistance. It has also been found that these new products can be converted to water soluble derivatives which are particularly useful and valuable as wet strength agents for paper. When applied in aqueous systems to paper, the new copolymers react therewith to give paper products having high wet strength values. Evidence of the superior properties of the new water soluble derivatives in this application is shown in the working examples at the end of the specification.

It has also been found that the above-described copolymers can be converted to valuable solvent soluble derivatives which are particularly useful for the preparation of films, coatings, moldings and the like.

The alpha,beta-ethylenically unsaturated aldehydes used in making the new polymers comprise those monoaldehydes having an ethylenic group in an alpha,beta-position relative to the aldehyde group, such as, for example, acrolein and alpha- and beta-substituted acroleins, as methacrolein, alpha-ethylacrolein, alpha-butylacrolein, alpha-chloroacrolein, beta-phenylacrolein, alpha-decylacrolein, alpha-cyclohexylacrolein and the like. Preferred aldehydes to be employed in making the copolymers include the alpha,beta-monoethylenically unsaturated monoaldehydes containing from 3 to 12 carbon atoms, and especially acrolein and the alpha- and beta-substituted acroleins where the substituent and the alpha and/or beta-positions is an alkyl, cycloalkyl or aryl group containing no more than 8 carbon atoms. 2-alkenals containing up to 8 carbon atoms come under special consideration.

The unsaturated ketones to be used in making the new copolymers comprise the mono- or polyketones having an ethylenic group in the alpha,beta- or beta,gamma-position relative to a ketone group, such as for example, methyl vinyl ketone, methyl isopropenyl ketone, ethyl vinyl ketone, butyl vinyl ketone, ethyl allyl ketone, octyl allyl ketone, dodecyl vinyl ketone and the like. Preferred ketones employed include those containing up to 10 carbon atoms, and especially the alkyl alkenyl ketones containing up to 8 carbon atoms.

The amount of the unsaturated aldehyde and the unsaturated ketone to be employed in making the new copolymers may vary within certain limits. The amount of the unsaturated aldehyde should be at least 5% by weight of the mixture and preferably not more than 99% by weight of the monomer mixture. Copolymers having particularly outstanding properties, especially as to solubility of the $SO_2$ derivative and reactive with other components are obtained when the unsaturated aldehyde varies from 55% to 99% by weight of the monomers being polymerized.

In some cases, it may be desirable to replace a portion of the unsaturated ketone with a dissimilar unsaturated monomer. Examples of such other monomers include styrene, allyl alcohol, vinyl acetate, acrylic and methacrylic acids and their alkyl esters, monoolefins, diolefins, allyl esters of monocarboxylic acids, vinyl pyridine, vinyl halides, vinyl pyrrolidone and the like, and mixtures thereof. These third monomers preferably make up from .1% to 40% by weight of the mixture of monomers.

The new copolymers of the invention are preferably prepared by polymerizing the monomers in an aqueous system using a redox polymerization catalyst system, i.e. a free radical catalyst and a reducing agent. Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, ditertiary butyl peroxide, ditertiary hexyl peroxide, acetyl benzoyl peroxide, cumene hydroperoxide, tetralin hydroperoxide, phenylcyclohexane hydroperoxide, tertiary-butylisopropyl benzene hydroperoxide, tertiary butyl peracetate, tertiary butyl perbenzoate, ditertiary butyl phthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain not more than 18 carbon atoms per molecule.

The above-described free radical yielding catalysts are employed in small amounts, the exact amount being dependent upon the particular type selected. In general, the amount of catalyst used will vary from about $1\times10^{-6}$ to about $2\times10^{-2}$ mols per mol of unsaturated monomer to be polymerized. Preferred amounts vary from about $1\times10^{-3}$ to $1\times10^{-4}$ mols per mol of material being polymerized.

The material employed with the above-described free radical yielding catalyst may be any of the various types of reducing agents. Examples of these include the organic sulfur compounds, such as sulfinic acids of their salts, alpha-oxysulfones, sulfoxylates, alphaamminosulfones, thioethers which are preferably substituted by a hetero atom such as nitrogen in alpha position, or mercaptans with the simultaneous presence of labile halogen, mono or polyvalent aliphatic alcohols, beta-mercaptoethanol, levulinic acid, sterol compounds, dicyandiamidine, thiobarbituric acid, sulfur dioxide of water-soluble sulfur compounds, and particularly the sulfur dioxide or bisulfite derivatives of previously formed polymers of acrolein. Especially preferred reducing agents to be employed include the sulfur dioxide adducts of polyacroleins having an I.V. of at least 0.3 dl./g. and prepared by polymerizing acrolein in a redox catalyst system as described for the preparation of the copolymers of the present invention.

Salts of multivalent metals may also be used as reducing agents in the present process, but their presence is less preferred than the above-described types. By multivalent metal is meant one that can change its valency state reversibly. Examples of such metals include, among others, iron, manganese, copper, vanadium, cobalt, nickel, tin, silver, titanium etc. When added to the reaction mixture the metal must be at least in part in a lower valency state such as, for example, ferrous chloride, silver nitrate, titanium dichloride, cobaltous chloride, ferrous pyrophosphate, potassium ferrocyanide, manganous sulfate, ferrous sulfate, and the like. The anion portion of the metal salt may be of any type as long as the resulting salt has the necessary solubility in the reaction medium.

The amount of the reducing agent employed will vary depending on the amount of the peroxide catalyst employed. It is preferred to have from about .3 mol to 1.5 mol of reducing agent per mol of peroxide catalyst. Preferably, the reducing agent is employed in an amount varying from about .5 to 1 mol per mol of peroxide.

Particularly good results are obtained when an anticoalescent agent is included in the reaction mixture. The presence of such materials bring about an increase in rate of copolymerization and maintenance of molecular weight. The agent may be cationic, anionic or non-ionic material and have a great variety of different compositions. Preferred materials include the ionic agents and especially those having a polar structure including a hydrophilic (predominantly hydrocarbon) residue and a charged (ionic) radical thereon, such as anionic surface active compounds including alkali metal and nitrogen-base soaps of higher fatty acids, such as potassium, and sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine hydrochloride, palmityl amine hydrobromide. Additional examples of suitable ionic surface-active agents include the alkali metal or ammonium alkyl or alkylene sulfates or sulfonates, such as sodium and/or potassium lauryl sulfate, alkyl, aryl and alkylated arylsulfonates, cetyl sulfonate, oleylsulfonate, stearylsulfonate, sulfonated Turkey red oil, sulfonated mineral oils, sodium, potassium and ammonium isopropyl naphthalene sulfonate, amine substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol.

Also preferred are the non-ionic surface active agents, i.e., those which are not salts and are not subject to ionization when added to water. Examples of these agents include, among others, partial esters of polyhydric alcohols and saturated or unsaturated fatty acids and preferably fatty acids containing at least and more preferably from 12 to 18 carbon atoms, and hexitans and hexitides such as sorbitan or mannitan monolaurate, monopalmitate, monostearate, monooleate or the monoesters of coconum oil fatty acids and the like products described in U.S. 2,322,820. Other examples of partial esters of this type include the pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, polyglycerol dilaurate, inositol monolaurate, glucose monostearate, sucrose monooleate, polyglycol monooleate, polyglycol monostearate, and the like.

Examples of other suitable non-ionic agents include the hydroxypolyoxyalkylene ethers of the above-described partial esters. Specific examples of this include, among others, the polyethylene glycol ethers of sorbitan or mannitan monolaurate, monopalmitate, monooleate or monostearate. Other examples include the polyethylene glycol ethers or pentaerythritol mono- and dipalmitate, pentaerythritol mono- and distearate, trimethylolpropane distearate, polyglycerol dilaurate, inositol monolaurate and the like.

Other examples include the hydroxypolyoxyalkylene ethers of phenols, such as the reaction product of ethylene oxide and/or propylene oxide and phenols as phenol, bisphenol-A, resorcinol, and the like, and mixtures thereof.

Other examples include di- and monoethers of polyhydric compounds and particularly the polyalkylene glycols. Especially preferred are the aryl and alkaryl polyethylene glycol ethers, such as phenyl polyethylene glycol monoether, xylylpolyethylene glycol monoether, alkyl phenyl polyalkylene glycol ethers, such as nonyl phenyl polyethylene glycol ether, isopropylphenyl polyethylene glycol monoether and the like.

The monomers to be polymerized may be added altogether at the beginning of the reaction or one or more of the monomers may be added in large amounts or in incremental proportions during the course of the reaction. If there is considerable difference in the rate of polymerization of the monomers, it is preferred to add the monomer which is consumed the fastest in small increments during the course of the polymerization reaction.

The temperature employed in the process may vary over a considerable range. It is generally preferred to employ relatively low temperatures. In general, temperatures will vary from the freezing point of the reaction mixture to about 50° C. Preferred temperatures range from about 0° C. to 40° C. Atmospheric, superatmospheric or subatmospheric pressures may be utilized as desired.

The polymerization is preferably effected in an inert atmosphere. This may be preferably accomplished by passing inert gases, such as nitrogen, methane, etc., into and through the reaction mixture. It is also preferred to distill the monomers under nitrogen before use in the process.

The process may be conducted batchwise or on a semi-continuous or continuous scale.

The copolymers will precipitate out as white solids and may be recovered by any suitable means, such as filtration, centrifugation and the like. After recovery, it is generally desirable to wash the copolymer with water and acetone and then dry the product.

The new copolymers can also be prepared by exposing a mixture of the monomers alone or in aqueous system to high energy ionizing radiation. If conducted in an aqueous system, the medium can contain any of the above-described anti-coalescent agents, emulsifying agents, stabilizing materials and the like. Various other materials, such as radiation accelerators as halides, metal salts and the like, may be added to the reaction mixture.

The radiation polymerization is preferably conducted in an inert atmosphere. This may be accomplished by the use of high vacuum or by the use of an inert atmosphere, such as an atmosphere of nitrogen, methane, ethane and the like.

The temperature employed during the radiation polymerization may vary over a considerable range. In general, temperatures range from about $-100°$ C. to $100°$ C. and more preferably from $10°$ C. to $80°$ C. With acrolein as a monomer, preferred temperatures range from $0°$ C. to about $50°$ C.

The kind of radiation suitable for use in the present invention includes high energy electrons, protons and photons. Electron beams are suitably produced by electron accelerators such as the Van de Graaff, resonance transformers, and linear accelerators or a suitable arrangement of certain isotopes, e.g., strontium 90. High energy photons suitable for use are, for example, X-ray produced by conventional X-ray tubes and electron accelerators and gamma rays which may be produced by decay of radioactive material such as cobalt 60, cesium 137 and fission products. The invention also contemplates use of high energy protons or neutrons.

The total dosage employed may vary over a wide range. Preferred total dosage varies from about $10^5$ to $5 \times 10^6$ rads; dosages of up to $5 \times 10^7$ rads or more, calculated on the total mixture, may be employed if polymer is removed from the irradiation zone after it is formed.

The dosage rate will also vary. Preferred dosage rates vary from about $10^4 \times 10^{12}$ rads per hour, and still more preferably $10^5 \times 10^{10}$ rads per hour.

The polymer found in liquid reaction mixtures will precipitate out as a solid and may be recovered by any suitable means, such as filtration, centrifugation and the like.

The copolymers are solid substantially white high molecular weight products. They preferably have intrinsic viscosities (as determined on the water-solubilized form) of at least 0.5 and preferably 0.9 to 5.0. These values are determined by the conventional technique of polyelectrolyte viscosity measurements at $25°$ C. On a mol. weight basis, such polymers have molecular weights ranging from about 100,000 to about 3,000,000 as determined by the light scattering technique.

The new copolymers are also characterized by the fact that they contain free aldehyde groups of potentially free aldehyde groups. The copolymers are also characterized by being insoluble in water and insoluble in conventional solvents, such as benzene, toluene, acetone and the like.

Materials such as acetone tend to swell the high mol. wt. polymers, but do not dissolve the material. The polymers may be dissolved by reaction with materials as alcohols, mercaptans and the like.

The above-described copolymers are thermoplastics and may be molded at high temperatures to form plastic articles. Temperatures used in the molding vary from about $90°$ C. to $300°$ C., and preferably between $100°$ C. and $250°$ C. Pressures employed in the molding may vary from about 3,000 p.s.i. to about 25,000 p.s.i. The moldings are usually transparent and flexible and can be used for a variety of plastic products, such as combs, pencils, etc.

The water-soluble derivatives of the new high molecular weight copolymers may be obtained by a variety of methods. They are preferably prepared by suspending the high molecular weight polymer in an aqueous solution containing the water-solubilizing agent, such as, for example, sulfur dioxide or an alkali bisulfite, such as sodium bisulfite. The amount of the polymer added will vary depending on the particular agent involved and the concentration of the agent. In general, it is preferred to add from 1 to 50 parts of the polymer per 100 parts of water. The concentration of the solubilizing agent will generally vary from about 1% to about 25%. Stirring and heating may be applied to assist in the dissolution. Temperatures employed will generally vary from about $20°$ C. to about $90°$ C. Various means, such as addition of small amounts of acid catalyst or the addition of swelling agents as acetone, tetrahydrofuran may also be employed to assist in the dissolution.

The water-soluble derivatives will have substantially the same molecular weight as the water-insoluble basic copolymer. In the case of the sulfur dioxide and bisulfite, the polymer will also contain a plurality or free sulfonic groups of water-soluble salt sulfonate groups contained in the polymer molecule and therefor may be regarded as polymeric polysulfonic acids and polymeric polysulfonates metal salts.

The water solubilized polymers may be used for a great many applications. As water solutions, they may be used in the formation of films, threads, treatment of animal skins, and the like, and as coatings for various materials as wood, metal and the like.

The copolymers solubilized wtih alkali bisulfites and aqueous sulfur dioxide have been found to be particularly useful as wet strength agents for paper. In this application, the polymers may be applied during the beater stage or as an after-treatment for the paper. Preferably the aqueous solution of the polymer is added during the beater stage when the suspension of paper pulp is being rapidly agitated. This addition may be at the beginning of the beater operation or intermittently or at the end of the operation. If the aqueous solution is applied to the finished paper, it may be added by spraying, or by rollers or by dipping or running the paper through the conventional padding apparatus.

After the aqueous solution has been applied to the paper as indicated above, the treated product is subsequently dried to effect cure. The drying may be accomplished by merely rolling or squeezing of the excess solution and then setting out in the air to dry or by using forced air. Temperatures used in the drying may vary from about room temperature, e.g., about $20°$ C. to $100°$ C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The paper treated according to the above may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The solvent-soluble derivatives of the above-described new high molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactive diluent, such as an aliphatic or cycloaliphatic alcohol, such as methanol, ethanol, ethylene glycol, hexylene glycol, 1,5-pentanediol and the like. The amount of polymer added will generally vary from about 1 to about 50 parts of polymer per 100 parts of solvent and swelling agent. The amount of catalyst employed will generally vary from about .1% to 5% by weight of the total solution. The amount of the swelling agent will vary from about 2 to 200 parts per 100 parts of the polymer. The amount of the reactive diluent employed will depend upon the degree of solubility and molecular structure change desired. If, for example, it is desired to convert all of the theoretical aldehyde groups to acetal groups, an excess over the theoretical amount of diluent needed to effect this change should be employed. In most cases, the amount of diluent employed will vary from about 10 parts to 1000 parts per 100 parts of the polymer.

Stirring and heating may be employed to assist in the formation of the solvent-soluble derivatives. In most cases, temperatures varying from about 20° C., up to and including reflux temperatures of the solution may be employed.

The solvent-soluble polymer derivative may be recovered by any suitable means, such as precipitation, extraction, distillation and the like.

The solvent-soluble derivatives are in most cases substantially white to light colored solids having substantially the same molecular weight as the basic insoluble polymer.

Solvent soluble derivatives of the polymer may be used in the preparation of moldings, coatings and impregnating solutions. The solvent soluble products may also be used as viscosity index improvers for various fluids, such as brake fluids and lubricating oil compositions.

To illustrate the manner in which the invention may be carried out, the following examples are given. It is to be understood, however, that the examples are for the purpose of illustration and the invention is not to be regarded as limited to any of the specific materials or conditions recited therein. Unless indicated, parts are by weight.

*Example I*

This example illustrates the preparation of a copolymer of acrolein and methyl vinyl ketone and the use of the copolymer of the preparation of water soluble derivatives.

To a glass reaction vessel were added the following components in the order indicated. 380 parts of water, 1 part of nonylphenol-ethylene oxide adduct, 0.5 part of 5 N sulfuric acid, 10 parts of methyl vinyl ketone, 90 parts of acrolein, 1.3 part of 6.3% of $SO_2$ adduct of polyacrolein and 20 parts of a 1.0 molar aqueous solution of tertiary butyl hydroperoxide. The above mixtures were stirred and kept at room temperature overnight. The reaction mixture was then filtered and a white solid precipitate recovered. The resulting product was identified as a copolymer containing 50% by weight of acrolein and 50% by weight of methyl vinyl ketone and had an intrinsic viscosity above 0.9 dl./g. The polymer was partially soluble in 1 N sodium hydroxide solution and completely solubilized in a solution of sulfur dioxide.

The sulfur dioxide solubilized polymer was cast out on glass plates to form a surface coating film. On evaporation of the water the coating was clear and glassy and had good flexibility.

A water solution of a sulfur dioxide solubilized copolymer was prepared and sheets of bleached kraft paper passed through the solution. The bleached sheets were then allowed to dry at room temperature. The resulting product had the appearance, feel and flexibility of the untreated paper but demonstrated improvement in fold endurance and dimensional stability and improvement in wet strength. The burst strength of the wet and dry sheet are shown in the following table in comparison to a control sample:

TABLE I

| Resin Concentration | Dry Burst Strength | Wet Burst Strength |
|---|---|---|
| 3% | 82 | 33 |
| 1% | 100 | 8 |
| ½% | 92 | 5 |
| Control | 78 | 2 |

*Example II*

Example I was repeated with the exception that the methyl vinyl ketone was employed in an amount of 10 parts and the acrolein was employed in the amount of 90 parts. Related results are obtained.

*Example III*

This example illustrates the preparation of a copolymer of 20% methyl vinyl ketone and 80% acrolein and the use of a water soluble derivative thereof for the treatment of paper.

To a glass reactor were added the following components in the order indicated: 380 parts of water, 0.5 part of nonylphenolethylene oxide adduct, 1 part of 0.1 N hydrochloric acid, 20 parts of methyl vinyl ketone, 80 parts of acrolein, 1.3 part of 6.3% solution of a polyacrolein $SO_2$ adduct and 20 parts of a 1 molar solution to tertiary butyl hydroperoxide. This mixture was stirred and kept overnight at room temperature. The mixture was then filtered to recover a white solid precipitate. The resulting product was identified as a copolymer containing 20% by weight of methyl vinyl ketone and 80% by weight of acrolein. The product was partially soluble in one normal sodium hydroxide but soluble in aqueous sodium disulfide.

The above-described copolymer could be molded at 140° C. and 600 lbs./p.s.i. pressure to form a clear plastic product having an Izod impact strength of 0.32 ft.-lbs./in.

The sulfur dioxide solubilized polymer could be cast to form a film which on evaporation was tact free and had good hardness and strength.

A 1% water solution of a sulfur dioxide solubilized copolymer was prepared and sheets of bleached kraft paper passed into and through the solution. The treated sheets were then allowed to dry at room temperature. The resulting product had the apperance, feel and flexibility of the untreated paper but demonstrated surprising improvement in dimensional stability and improved in wet strength.

*Example IV*

The process of Example III was repeated with the exception that the amount of methyl vinyl ketone was 30 parts and the acrolein was 70 parts. The resulting product was a high molecular weight water insoluble white powder which could be molded at 150° C. and 600 lbs./p.s.i. to give a hard clear casting having an impact strength of 0.5.

The above described polymer was dissolved in an aqueous sulfur dioxide solution and the resulting mixture cast to form a film which on evaporation was tact free and had good hardness and strength.

A 1% water solution of the sulfur dioxide solubilized copolymer was prepared and used to dip impregnate unbleached kraft paper. The resulting paper had good wet and dry strength and improved fold endurance.

*Example V*

To a glass reaction vessel were added the following components in the order indicated: 560 parts of water, 1 part of nonylphenol-ethylene oxide adduct, 2.7 parts of a 6.3% solution of a sulfur dioxide derivative of polyacrolein, 180 parts of acrolein, 20 parts of methyl vinyl ketone, 40 parts of a 0.05 molar solution of tertiary butyl hydroperoxide. The above mixture was stirred and kept at room temperature overnight. The reaction mixture was then filtered and a white solid precipitate recovered. The resulting product was identified as a copolymer containing 90 parts of acrolein and 10 parts of methyl vinyl ketone. The copolymer had an intrinsic viscosity of 0.97 dl./g.

The copolymer was insoluble in sodium hydroxide but soluble in aqueous sulfur dioxide. The above described copolymer was molded at 125° C. and 6,000 p.s.i. to form an opaque plastic casting having good flexibility.

The sulfur dioxide solubilized polymer was cast to form a surface coating film which had good hardness and strength, 8305 p.s.i. break tensile, 3.4% break elongation, $3.01 \times 10^5$ modulus.

A 1% water solution of a sulfur dioxide solubilized copolymer was prepared and sheets of bleached kraft paper passed into and through the solution. The treated sheets were then allowed to dry at room temperature. The resulting had the appearance of the untreated paper, demonstrated improved fold endurance and wet strength. The burst strength of the treated sheet was 101 dry and 11 wet as compared to a control having dry burst strength of 78 and a wet burst strength of 2.

*Example VI*

This example illustrates the preparation of a copolymer of 70 parts of acrolein and 30 parts of methyl vinyl ketone and the use of a water soluble derivative thereof for the treatment of paper.

To a glass reactor were added the following components in the order indicated: 560 parts of water, 1 part of nonyl-phenolethylene oxide adduct, 2.7 parts of a 6.3% solution of a polyacrolein-SO$_2$ adduct, 140 parts of acrolein, 60 parts of methyl vinyl ketone and 40 parts of a 0.05 molar solution of tertiary butyl hydroperoxide. The above mixture was stirred and kept overnight at room temperature. The reaction mixture was filtered to recover a white finely divided powder. This powder was identified as a copolymer and containing 70 parts of acrolein and 30 parts of vinyl ketone. The copolymer was soluble in aqueous sulfur dioxide.

The above-described copolymer could be molded at 150° C. to form an opaque plastic casting having good flexibility.

The sulfur dioxide solubilized polymer could be cast to form a surface coating which on evaporation became tact free and had good hardness and strength.

A 1% water solution of a sulfur dioxide solubilized copolymer was prepared and used to dip impregnate sheets of bleached kraft paper as described in the preceding examples. The resulting product had a dry burst strength of 101 and a wet strength of 11 as compared to a control having a dry strength of 72 and a wet strength of 2.

*Example VII*

Examples I to III are repeated with the exception that methyl vinyl ketone is replaced by butyl vinyl ketone. Related results are obtained.

*Example VIII*

Examples I to IV are repeated with the exception that the methyl vinyl ketone is replaced by octyl vinyl ketone. Related results are obtained.

*Example IX*

To a glass reactor are added the following components in the order indicated: 560 parts of water, 1 part of nonyl-phenolethylene oxide adduct, 2.7 parts of 6.3% polyacrolein-SO$_2$ adduct in an aqueous solution, 50 parts of acrolein, 50 parts of methyl isopropenyl ketone, and 40 parts of a 0.05 molar solution of tertiary butyl hydroperoxide. This mixture was stirred and kept at room temperature overnight. The resulting product was a white solid copolymer having an intrinsic viscosity above 0.9 dl./g. The product was insoluble in sodium hydroxide but soluble in aqueous sulfur dioxide.

A 1% water solution of the above-described peroxide solubilized polymer was used to dip impregnate unbleached kraft paper as in the preceding examples. The treated sheet had improved dry and wet strength and improved fold endurance.

*Example X*

A mixture of 70 parts acrolein and 30 parts methyl vinyl ketone was added to water to form a 20% solution. This mixture was then placed in a glass reactor and the air swept out with nitrogen. The reactor was sealed and exposed to X-rays at a temperature of 25° C. for 30 minutes. The dose rate was $10^6$ rads with a total dosage of $5 \times 10^5$ rads. At the conclusion of the exposure time, the reactor was opened and the solution filtered to remove the solid polymer. The resulting product was identified as a copolymer of acrolein and methyl vinyl ketone. The product was soluble in aqueous sulfur dioxide and formed a water-soluble derivative therewith. The product was swollen in acetone.

Related products are obtained by varying the proportions of acrolein and methyl vinyl ketone as follows: 60 parts acrolein-40 parts methyl vinyl ketone and 90 parts acrolein and 10 parts methyl vinyl ketone.

*Example XI*

1 part of the copolymer produced in Examples I to V are combined with 40 parts of methanol, 160 parts of ethylene dichloride and .2 part of p-toluenesulfonic acid. The mixture was stirred and the copolymer slowly went into solution. Evaporation of the solution gives a solid acetal derivative. The polymeric acetal could be molded at 250° C. to give a hard plastic product.

Related results are obtained by replacing the methanol with each of the following: ethanol, butanol, cyclohexanol and octyl alcohol. Polymeric acetal derivatives are obtained.

We claim as our invention:

1. A solid high molecular weight copolymer of an ethylenically unsaturated aldehyde and an ethylenically unsaturated ketone, said copolymer having an intrinsic viscosity of at least 0.5 dl./g. and resulting from addition polymerization of the monomers at the ethylenic groups.

2. A solid water insoluble high molecular weight copolymer of acrolein and an alkyl alkenyl ketone having up to 12 carbon atoms, said copolymer having an intrinsic viscosity between 0.5 and 5 dl./g., said copolymer resulting from addition polymerization of the monomers at the ethylenic groups.

3. A water insoluble high molecular weight copolymer of acrolein and methyl vinyl ketone having an intrinsic viscosity between 0.5 and 5 dl./g., said copolymer resulting from addition polymerization of the monomers at the ethylenic groups.

4. A copolymer as defined in claim 3 wherein acrolein makes up from 5% to 99% by weight of the copolymer.

5. A copolymer as defined in claim 3 wherein acrolein makes up from 55% to 99% by weight of the copolymer.

6. A copolymer as in claim 3 wherein the acrolein makes up 30 to 60% by weight and the methyl vinyl ketone makes up 70% to 40% by weight of the copolymer.

7. A polymer defined in claim 1 substituted with at least one member of the group consisting of sulfonic acid groups and water-soluble salt sulfonate groups, said substituted polymer being soluble in water.

8. An SO$_2$ water soluble derivative of the polymer defined in claim 1.

9. A sodium bisulfite derivative of a polymer defined in claim 1.

10. A process for treating paper to improve the wet strength thereof which comprises applying to the paper an aqueous solution of a copolymer defined in claim 1, substituted with at least one member of the group consisting of sulfonic acid groups and water-soluble salt sulfonate groups, said substituted polymer being soluble in water.

11. A process for treating paper to improve the wet strength thereof which comprises applying to the paper an aqueous solution of a sulfur dioxide adduct of the copolymer defined in claim 1.

12. A solvent soluble acetal of a copolymer of an ethylenically unsaturated aldehyde and an ethylenically unsaturated ketone, said copolymer having an intrinsic viscosity above 0.5 dl./g. and being formed by addition polymerization at the ethylenic group.

13. An acetal of an alkanol and a high molecular weight copolymer of acrolein and an ethylenically unsaturated ketone, said copolymer having an intrinsic viscosity between 0.5 dl./g. and 5.0 dl./g. and being formed by addition polymerization at the ethylenic group.

14. An acetal of an alkanol containing up to 8 carbon atoms and a high molecular weight copolymer of acrolein and methyl vinyl ketone formed by polymerization at the ethylenic double bonds and having an intrinsic viscosity of a least 0.5 dl./g.

References Cited by the Examiner

UNITED STATES PATENTS

| | | | |
|---|---|---|---|
| 2,549,508 | 4/1951 | Mottern | 260—64 |
| 2,657,192 | 10/1953 | Miller et al. | 260—73 |
| 2,674,591 | 4/1954 | White et al. | 260—64 |
| 2,875,180 | 2/1959 | Snyder | 260—64 |
| 3,019,157 | 1/1962 | Reynolds et al. | 162—168 |
| 3,022,214 | 2/1962 | Daniel | 162—168 |
| 3,068,203 | 12/1962 | Schweitzer | 260—67 |

FOREIGN PATENTS 490,471 2/1953 Canada.

WILLIAM H. SHORT, *Primary Examiner.*

MILTON STERMAN, LOUISE QUAST, *Examiners.*

B. S. BUTTERMARK, L. M. MILLER,
*Assistant Examiners.*